Nov. 12, 1929.  C. H. LEINERT  1,735,205
VALVE FOR COMPRESSORS
Filed Feb. 21, 1927   2 Sheets-Sheet 1
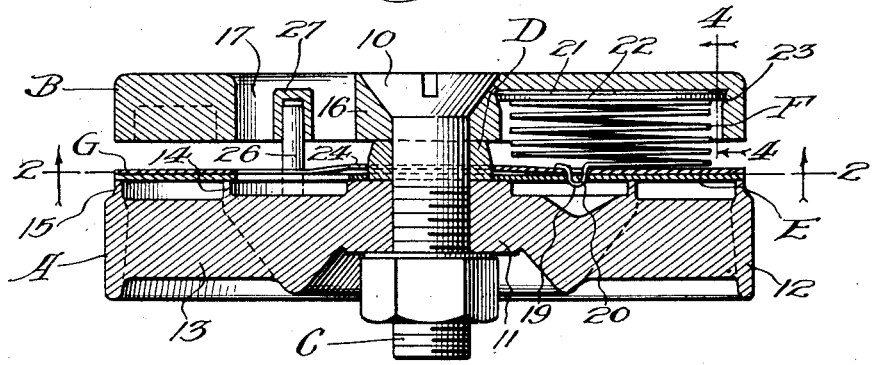
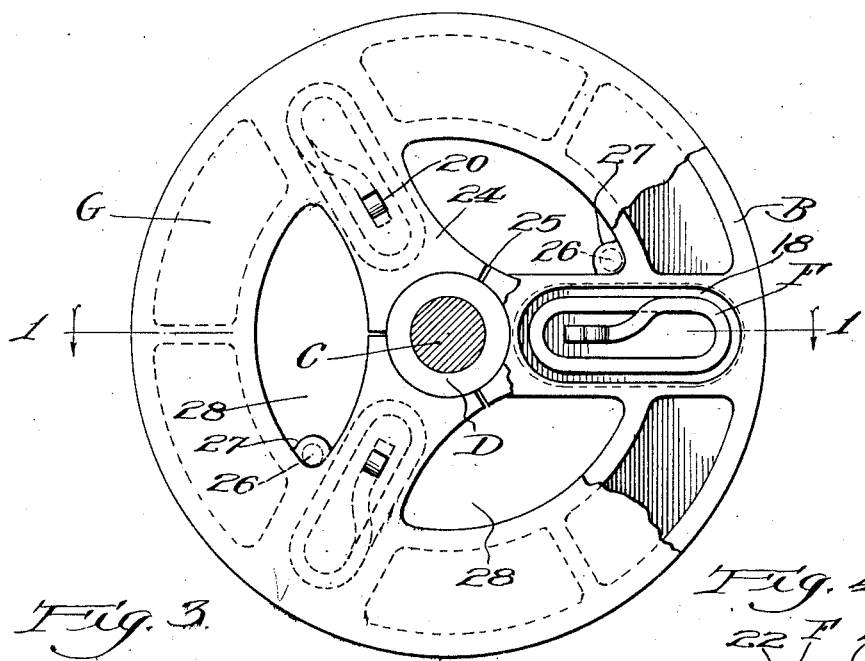
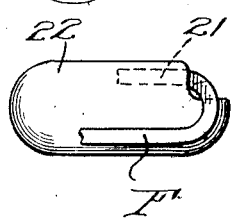
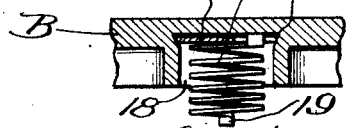
Inventor:
Charles H. Leinert Nov. 12, 1929.     C. H. LEINERT     1,735,205
VALVE FOR COMPRESSORS
Filed Feb. 21, 1927     2 Sheets-Sheet 2
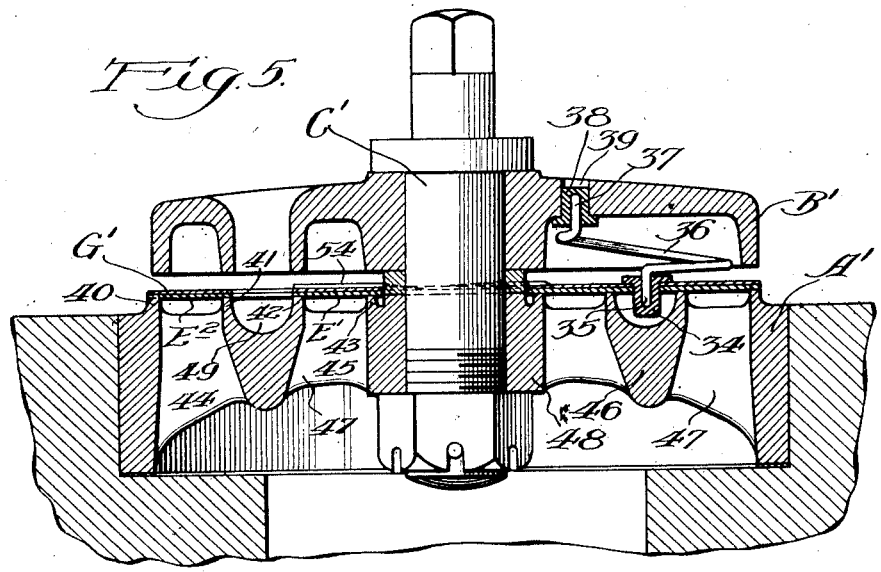
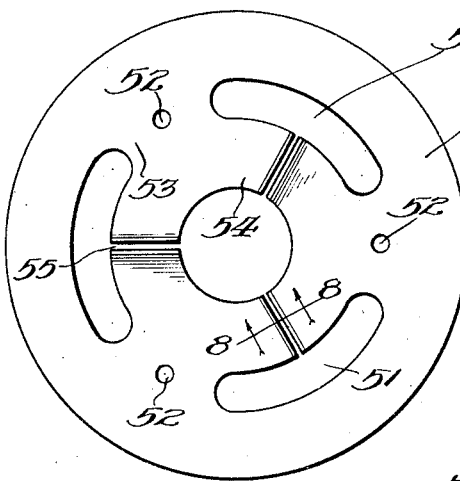
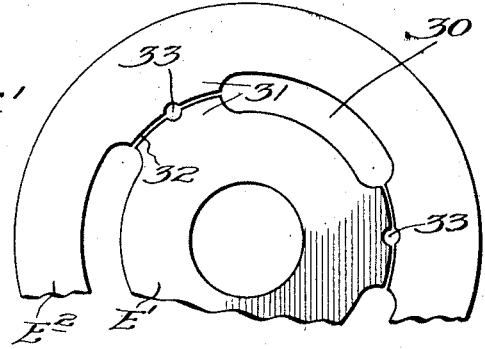
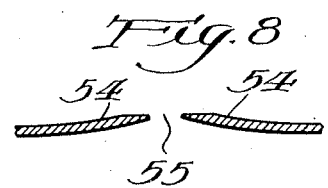
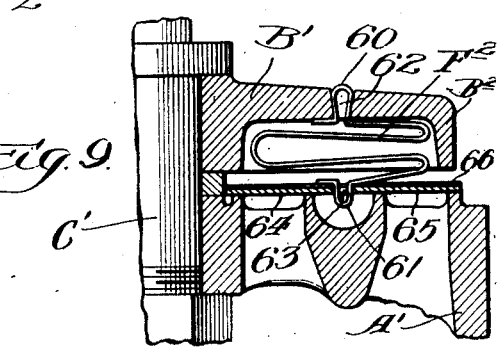
Inventor:
Charles H. Leinert, Patented Nov. 12, 1929

1,735,205

UNITED STATES PATENT OFFICE

CHARLES H. LEINERT, OF CHICAGO, ILLINOIS, ASSIGNOR TO LEINERT VALVE COMPANY, OF CHICAGO, ILLINOIS, A CORPORATION OF ILLINOIS

VALVE FOR COMPRESSORS

Application filed February 21, 1927. Serial No. 169,723.

This invention relates to a valve either suction or discharge, which is particularly adapted for use with compressors, blowing engines, and the like.

It is an object of this invention to provide in a plate-valve mechanism of the kind mentioned a buffer for cushoning the valve disk when striking against its stop; a guiding means for the valve disk and buffer such as to prevent rotative movement relative to each other and the valve seat; and an improved mounting for the spring means which is associated with the valve disk for normally holding it upon its seat. It is a further object to utilize a duplex valve plate which comprises a pair of disks having provision for contraction and expansion so that distortion or warping may be prevented and to provide for such disks a free mounting on spring means which urge both of said disks in unison to their seats. These and other objects of my invention will be more fully pointed out hereinafter.

Two suggestive embodiments of the present invention are illustrated in the accompanying drawings in the manner following:

Figure 1 is an axial section through the valve assembly taken on line 1—1 of Fig. 2;

Fig. 2 is a transverse section taken on line 2—2 of Fig. 1;

Fig. 3 is a detail in elevation of the retaining plate for one of the valve springs;

Fig. 4 is a sectional detail taken on line 4—4 of Fig. 1;

Fig. 5 which is a sectional view similar to Fig. 1 shows a modification of my invention;

Fig. 6 is a plan view of the buffer or cushion plate shown in Fig. 5;

Fig. 7 is a similar view, partly broken away, of the duplex valve plate shown in Fig. 5;

Fig. 8 is an enlarged detail in section, taken on line 8—8 of Fig. 6; and

Fig. 9 is a fragmentary axial section showing a modification of the spring means adapted to co-operate with a duplex valve plate.

The present valve, which may operate with either suction or discharge is particularly suitable for use with blowers of the type which discharge relatively large volumes of air at comparatively low pressures. Such blowers are commonly operated at high speed so that the check valves controlling the inlet and discharge ports for air are also reciprocated at high speeds. Owing to conditions such as these, as well as the high temperatures of the air which the valves control, the moving parts thereof are submitted to hard usage which results in their frequent wearing out, with a consequent necessity for their renewal or repair. With the end in view of prolonging the life of such a valve, and of rendering its operation more efficient, the present improvements have been devised.

Referring to the drawings, I have shown a discharge valve which is adapted for attachment directly to a compressor wall or to a cage which is carried thereby, the valve assembly including a seat member A with which is associated a stop plate B detachably connected to the seat as through the medium of a bolt C the head 10 of which may rest against the outer side of the stop plate, as shown. Interposed between these parts is a distance piece D which may also serve as a centering means for a reciprocable valve plate E in the form of a disk against which a constant pressure is exerted by spring means F, the disk being thereby held normally upon its seat. The parts just enumerated are the principal ones which enter into the construction of this valve, but they are specially formed to cooperate with each other in a peculiar manner as will now be set forth.

The body of the seat member comprises a hub 11, a rim 12, and connecting webs or spokes 13 between which are arcuate-shaped openings having an aggregate area which, by preference, is the maximum obtainable with due regard to safety and strength. The member A is formed with a seat comprising inner and outer annular ribs 14 and 15 respectively. The proximate end of the hub is also shown to terminate in a plane which is coincident with these ribs, so that the valve plate E is supported thereupon as well. The bolt C which I have suggested as a convenient means for attaching the stop plate to the seat member permits these parts to be readily disconnected whenever desired. The distance piece D which is in the form of a bushing is disposed with one end against the hub 11 of the seat member and with its outer end against a hub 16 that is formed centrally of the stop plate. This bushing extends through a central aperture in the valve plate so as to have capacity for centering the latter when resting upon its seat.

In the stop plate are also formed arcuate-shaped openings 17 providing ports through which air may pass. Intermediately of these ports are certain pockets 18 elongated in a radial direction to receive the spring means F. In the form shown in Figs. 1 to 4 inclusive, such means comprises in each instance a flat wire spring with elongated coils, one end of the spring being crimped to provide a head 19 which is insertable through a slot 20 in the valve plate so as to connect therewith. The other spring end 21 is hooked behind a retaining plate 22 having a fixed mounting adjacent the bottom of the pocket 18. For securing this plate therewithin, the walls of the pocket adjacent its bottom are undercut as at 23 permitting the plate to be inserted therein only when slightly curved or arched. When the plate is flattened so as to expand into the undercut edges adjacent the pocket bottom, it is securely locked therein. The spring is also secured permanently in place by reason of its hooked end 21 being disposed between the retaining plate and the pocket bottom, as shown.

In order to prevent sudden arrest in the movement of the valve plate when approaching the stop plate, I provide a cushion means which may take the form of a buffer plate G. This cushion plate may be of the same diameter as the valve plate, and have similar port openings in register therewith, and is interposed between the valve plate and the stop plate, as shown best in Fig. 1. It is formed with certain radial spring arms 24 each of which partly encircles the distance piece D. These arms approach each other but remain separated as at 25 so as to have no common connection except at a point remote from the axis of the valve. Each of the arms, in the region of the distance piece, is slightly inclined away from the valve plate E so as to be spaced therefrom at such point. By reason of the inclined inner ends of the spring arms 24, movement of the valve plate will be continued until after the cushion plate has first engaged with the stop plate. In this manner the cushion plate acts as a buffer to prevent sudden striking of the valve plate when reaching the end of its movement toward the stop plate.

I also provide certain guiding means which hold the valve plate and cushion plate against relative rotation so that their port openings remain in perfect register. For this purpose two or more pins 26 are upstood from the seat member to present their outer ends within sockets 27 that are formed in the stop plate, each preferably adjacent one end of one of the ports 17 therein. These pins are also disposed adjacent the ends of the elongated port openings 28 in the valve and cushion plates, and act to interfere with rotative movement thereof. In this manner both plates, as well as the stop plate, are held in mutual register at all times.

Certain of the features of construction just described may be embodied in the modified construction which is shown in Figs. 5 to 8 inclusive. In these I have shown a seat member A' with a cooperating stop plate B', the two being detachably connected by a bolt C'. The valve plate in this instance is of duplex character, in that it comprises inner and outer plates $E^1$ and $E^2$ respectively, each having certain peripheral recesses which together provide port openings 30. Between these openings the plates approach each other with web formations 31, although remaining slightly spaced as at 32. Between the webs I provide, as shown in Fig. 7, circular openings 33 in each of which may be received a flanged bushing 34 providing a socket for the reception of one end 35 of a wire spring 36. The opposite end 37 of the spring may be carried in a second flanged bushing 38 which is mounted within a socket 39 in the stop plate. In this manner I position between the valve plate and the stop plate spring means which tend to hold the valve plate upon the seat member A'.

The valve plate, when seated, is in contact with certain annular ribs 40, 41, 42 and 43 upstanding from the seat member, there being port openings 44 and 45 between the first two and last two of said ribs, respectively. The intermediate ribs 41 and 42 are carried upon an annulus 46 which is supported by webs or spokes 47 extending from the outer rim of the seat member to its hub 48. Between the ribs 41 and 42 in the annulus is an annular channel 49 providing space for the projecting ends of the bushings 34.

With the construction just described I may also use a buffer plate G', the same in general as has already been suggested. As shown best in Fig. 6, this plate is also provided with port openings 51 adapted to register with the corresponding openings 30 in the valve plate. It is also formed with circular openings 52 which register with the openings 33 in the valve plate so as to receive therein the same bushings 34 which are inserted into the latter. By this means, the valve and cushion plate are held against rotative movement one with respect to the other so that the port openings also remain registered at all times. The cushion plate in the construction of Fig. 6 is provided with radial arms 53 having heads 54 which approach the others but remain separated therefrom as at 55. The several heads of these arms may also be inclined slightly near their meeting edges so as to upstand from the valve plate and provide a cushion means which arrests movement of the valve plate when approaching the stop plate. A cross section through two adjacent heads of the cushion plate is shown in Fig. 8.

The construction suggested in Fig. 9 is identical with that set forth in Figs. 5, 6, and 7 except for the spring means $E^2$. As shown, this comprises a flat wire bent upon itself so as to exert opposite forces at its two ends near which are crimps forming heads 60 and 61. The head 60 may be snapped into place within a socket 62 in the stop plate $B^2$ whereby it is connected therewith in unitary relation. The other head 61 is entered through a rectangular slot 63 between inner and outer disks 64 and 65 of a duplex valve plate, and also through a registering slot in an associated buffer plate 66. The connection between this head and the valve and buffer plates may be such as to retain these ports in unitary relation with each other and with the spring. By the use of a plurality of spring means, as suggested, a balanced tension is maintained on the two disks of the duplex valve plate, and also upon the associated buffer plate so that relative movement therebetween is effectively prevented.

It should be obvious that certain of the various features herein disclosed may be combined together as shown, or be optionally used otherwise. For example, the type of spring means shown in Figs. 1 to 4 inclusive may be associated with the duplex valve plate construction which is shown in Figs. 5 to 9 inclusive; also the buffer plate which cushions the valve disk when brought to rest against the stop plate may or may not be used with the type of construction herein disclosed. These several features may, however, be combined in one or more ways, as desired, so as to produce intended results.

I claim:

1. A valve of the kind described in which is combined a seat member and a stop plate in spaced relation, a valve plate resting upon the seat member, spring means disposed between the valve plate and the stop plate, and a fast connection between the spring means and the stop plate comprising a member expanded into a locking fit within the latter, and having a portion of the spring means secured between itself and a stop plate, substantially as described.

2. A valve of the kind described in which is combined a seat member and a stop plate in spaced relation, a valve plate resting upon the seat member, a coiled spring interposed between the valve plate and the stop plate, and a retaining plate disposed between two of the coils of the spring and secured to the stop plate whereby to connect the spring fast thereto, substantially as described.

3. A valve of the kind described having in combination a seat member and, spaced therefrom, a stop plate wherein is a pocket, a valve plate resting upon the seat member, a coiled spring disposed within the socket and exerting pressure on the valve plate to hold it against its seat, and a retaining means disposed between two of the coils of the spring and secured within the pocket of the stop plate whereby the spring is connected fast thereto, substantially as described.

4. A valve of the kind described having in combination a seat member and, spaced therefrom, a stop plate having a pocket the bottom of which is undercut, a valve plate resting on the seat member, a coiled spring within the pocket of the stop plate exerting pressure on the valve plate, and retaining means disposed between two of the coils of the spring extended into the undercut of the pocket whereby to secure the spring to the stop plate, substantially as described.

5. A valve of the kind described having in combination a seat member and, spaced therefrom, a stop plate, a valve plate resting upon the seat member, there being registrable port openings in the valve plate and stop plate, means extended from the seat member to the stop plate and connected fast with one and loosely with the other for preventing rotation of the stop plate relative to the seat member, said means being also disposed adjacent one edge of a port opening in the valve plate whereby to prevent rotation thereof relative to the associated parts, and spring means between the stop plate and valve plate tending to hold the latter upon the seat member, substantially as described.

6. A valve of the kind described having in combination a seat member and, spaced therefrom, a stop plate, a duplex valve plate resting upon the seat member and comprising inner and outer disks having portions thereof in close proximity with an opening therethrough, and spring means having a portion thereof extended within said opening to connect with said disks and another portion in engagement with the stop plate and adapted to exert pressure upon both disks of the valve plate whereby to hold the same against the seat member, substantially as described.

7. A valve of the kind described having in combination a seat member and, spaced therefrom, a stop plate, a duplex valve plate comprising inner and outer disks, a common means overlying a portion of both disks, and a spring associated with the stop plate and exerting a pressure against said common means whereby to hold both disks against the seat member, susbtantially as described.

8. A valve of the kind described in which is combined a seat member and, spaced therefrom, a stop plate, a duplex valve plate comprising inner and outer disks resting on the seat member, there being portions cut out from adjacent parts of the inner and outer disks to provide registering openings, means seated within said openings for holding the two disks against relative rotary movement, and a spring interposed between the stop plate and said seated means adapted to exert a balanced pressure on both disks whereby they are held on the seat member, substantially as described.

9. A valve of the kind described in which is combined a seat member and, spaced therefrom a stop plate, a duplex valve plate associated with the seat member and comprising inner and outer disks having portions cut from their adjacent edges to provide port openings and also a plurality of smaller openings, flanged bushings seated within said smaller openings to prevent relative rotation between the two disks, and springs associated with the stop plate each having one end received within one bushing whereby to exert a balanced pressure upon the two disks, substantially as described.

10. A valve of the kind described in which is combined a seat member and, spaced therefrom, a stop plate, a duplex valve plate comprising inner and outer disks both resting on the seat plate, a cushion plate between the valve plate and the stop plate, and springs associated with the stop plate each having a portion of itself entered through the cushion plate and between the two disks of the valve plate adapted to preserve the cushion plate and two disks of the valve plate in a fixed rotative position, substantially as described.

CHARLES H. LEINERT.